US007292873B2

(12) United States Patent
Wei et al.

(10) Patent No.: US 7,292,873 B2
(45) Date of Patent: Nov. 6, 2007

(54) METHOD AND APPARATUS FOR REGULATING BASE STATION ACK/NAK MESSAGE TRANSMIT POWER IN A WIRELESS COMMUNICATION SYSTEM

(75) Inventors: Yongbin Wei, San Diego, CA (US); Tao Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 410 days.

(21) Appl. No.: 10/637,226

(22) Filed: Aug. 7, 2003

(65) Prior Publication Data
US 2005/0032536 A1 Feb. 10, 2005

(51) Int. Cl.
H04B 7/00 (2006.01)
(52) U.S. Cl. .......................... 455/522; 455/69
(58) Field of Classification Search ............ 455/69, 455/70, 452.1, 522, 436–439, 422.1, 252; 370/329, 252, 343
See application file for complete search history.

(56) References Cited

U.S. PATENT DOCUMENTS

| | | | | |
|---|---|---|---|---|
| 5,751,725 A * | 5/1998 | Chen | ............................ | 714/708 |
| 5,893,035 A * | 4/1999 | Chen | ............................ | 455/522 |
| 5,960,361 A * | 9/1999 | Chen | ............................ | 455/522 |
| 5,982,760 A * | 11/1999 | Chen | ............................ | 370/335 |
| 6,075,974 A * | 6/2000 | Saints et al. | ................... | 455/69 |
| 6,101,168 A * | 8/2000 | Chen et al. | ................. | 370/228 |
| 6,167,270 A * | 12/2000 | Rezaiifar et al. | ........... | 455/442 |
| 6,317,435 B1 * | 11/2001 | Tiedemann et al. | ......... | 370/441 |
| 6,480,472 B1 * | 11/2002 | Jou et al. | ..................... | 370/252 |
| 6,512,925 B1 * | 1/2003 | Chen et al. | ................. | 455/442 |
| 6,643,272 B1 * | 11/2003 | Moon et al. | ................ | 370/311 |
| 6,785,249 B2 * | 8/2004 | Soliman | ..................... | 370/335 |
| 6,831,910 B1 * | 12/2004 | Moon et al. | ................ | 370/342 |
| 6,909,881 B2 * | 6/2005 | Uehara et al. | ............... | 455/69 |

(Continued)

FOREIGN PATENT DOCUMENTS

EP 1326361 7/2003

OTHER PUBLICATIONS

Philips, "Further results on methods for reducing the power required for ACK/NACK signalling," 3GPP TSG RAN WGI-23. TDOC R1-02-0042, Online Jan. 8, 2002-Jan. 11, 2002 XP002312257 ESPOO, Finland.

*Primary Examiner*—Edward F. Urban
*Assistant Examiner*—Tu X. Nguyen
(74) *Attorney, Agent, or Firm*—Rupit Patel; George J. Oehling; Thomas Rouse (57) ABSTRACT

A base station (LBS) (110) in a wireless network (100) establishes power levels for transmitting messages acknowledging receipt of packet data from a mobile communications device (MAD) (114). In one implementation, the LBS infers whether the MAD received a given acknowledgement message by considering whether (306, 316) the next communication from the MAD comprises new packet data, and whether (310, 320) that data comprises re-transmitted data. The LBS adjusts (312, 314, 322, 324) transmit power level for future acknowledgement messages according to whether the MAD received past acknowledgement messages. In a different implementation, actual/estimated transmit power from a serving base station to a given MAD is averaged (404), and increased (406) by a prescribed amount to yield a target level. Whenever the non-serving base station transmits messages acknowledging receipt of packet data from the MAD, the non-serving base station transmits (408) at the target level.

20 Claims, 4 Drawing Sheets

U.S. PATENT DOCUMENTS 6,996,763 B2 * 2/2006 Sarkar et al. ............... 714/749
2002/0154610 A1 * 10/2002 Tiedemann et al. ......... 370/329
2004/0179493 A1 * 9/2004 Khan ......................... 370/332
2004/0252670 A1 * 12/2004 Rong et al. ................. 370/343

* cited by examiner

METHOD AND APPARATUS FOR REGULATING BASE STATION ACK/NAK MESSAGE TRANSMIT POWER IN A WIRELESS COMMUNICATION SYSTEM

BACKGROUND

1. Field

The present invention generally relates to wireless communication systems. More particularly, the invention relates to a method and apparatus for regulating base station transmission power in a wireless communication system.

2. Background

In a digital wireless communications network, mobile stations exchange voice and packet data with base stations that are dispersed over a wide geographical area. Voice data concerns voice telephone calls and packet data relates to messages involved in surfing the Internet, delivering e-mail, and the like. There are still further channels dealing with text messaging (for example "short messaging service") as well as various other services.

This information exchange is conducted over a variety of different forward and reverse link channels of the wireless communication network. Each channel is defined by a combination of physical and logical parameters. A forward link concerns communications from base stations to mobile stations, and reverse link concerns communications in the opposite direction. In networks of certain architectures, such as some releases of CDMA 2000, each mobile station receives forward link packet data from a single base station called the "serving" base station. The mobile station, however, transmits reverse link packet data to multiple base stations within range. Each intended base station, namely each of these base stations that is in the mobile's "active set," separately acknowledges the data with a positive acknowledgement message (ACK) after receiving reverse link data from the mobile station correctly, or with a negative acknowledgement (NAK) after receiving reverse link data from the mobile station with error.

Setting the transmit power level for this ACK/NAK message can be a particular challenge. If the transmit level for the ACK/NAK message is too high, the base station unnecessarily wastes power, and further risks degrading other unrelated communications by bleed-over or other interference. Conversely, if the transmit level for the ACK/NAK message is too low, the mobile station may not receive it correctly, causing the mobile station to improperly respond to the ACK/NAK by submitting an incorrect response to the base station. Some undesirable results of this include consuming more of the mobile's limited battery power, wasting reverse link capacity, and increasing communication latency.

In the case of reverse link packet data communications received at the serving base station, setting the transmit power level for ACK/NAK messages is typically easier. Namely, message protocol dictates that mobiles send their serving base station a channel quality message. In the CDMA-2000 architecture, this message is sent on the reverse link channel quality indicator channel (R-CQICH). The channel quality message assesses the forward link channel quality from the serving base station to the mobile station. Thus, the serving base station can readily select the transmit power level of ACK/NAK messages to a given mobile by utilizing channel quality messages from that mobile as feedback.

As for non-serving base stations, however, there is no such feedback. Only the serving base station provides forward link packet data to the mobile station. Accordingly, the mobile station only provides forward link channel quality data to the serving base station. Yet, the non-serving base stations still receive reverse link packet data from mobiles, and acknowledge such receipt. Thus, the non-serving base stations set transmit power of their ACK/NAK messages in the "blind." If the power level turns out to be excessive, the base station unnecessarily wastes power, and further risks degrading other unrelated communications by bleed-over or other interference. If the ACK/NAK transmit level is too low, the mobile station may not receive it correctly, in which case the mobile could send the base station a response that is inappropriate to the ACK/NAK message that the base station actually transmitted. This may undesirably consume more of the mobile's limited battery power, waste the reverse link capacity, and increase the communication latency.

SUMMARY

In one aspect of the invention, a method for adjusting a transmit power level of a base station, which transmits messages that acknowledge receipt of packet data from a mobile communication device (MAD), is provided. The method includes transmitting an acknowledgement message to the MAD in response to receiving first packet data therefrom. It is determined whether the acknowledgement message was correctly received by the MAD based on whether a next communication received by the base station from the MAD includes second packet data that was a re-transmission of the first packet data transmitted by the MAD or new packet data. The transmit power level of the base station is adjusted for future acknowledgement messages transmitted to the MAD based on determining whether the transmitted acknowledgement message was correctly received by the MAD.

In another aspect of the invention, an apparatus for adjusting a transmit power level of a base station is provided. The base station transmits messages that acknowledge receipt of packet data from a mobile communication device (MAD). The apparatus includes means for transmitting an acknowledgement message to the MAD in response to receiving first packet data therefrom, and means for determining whether the acknowledgement message was correctly received by the MAD based on whether a next communication received by the base station from the MAD includes second packet data that was a re-transmission of the first packet data transmitted by the MAD or new packet data. The apparatus further includes means for adjusting the transmit power level of the base station for future acknowledgement messages transmitted to the MAD based on determining whether the transmitted acknowledgement message was correctly received by the MAD.

DETAILED DESCRIPTION

The nature, objectives, and advantages of the invention will become more apparent to those skilled in the art after considering the following detailed description in connection with the accompanying drawings.

The present disclosure is described in the context of a wireless communications network with various base stations and mobile communications devices, among other components. Base stations and mobile communication devices exchange various packet data, and may also exchange voice communications, depending upon the network architecture. Relative to each mobile communication device, there is one serving base station and zero, one, or more non-serving base stations depending upon the mobile communication device's proximity to the other base stations in the network. Each non-serving base station employs certain techniques to set the power level for transmitting messages that acknowledge receipt of packet data from the mobile communication devices.

Figure 1:
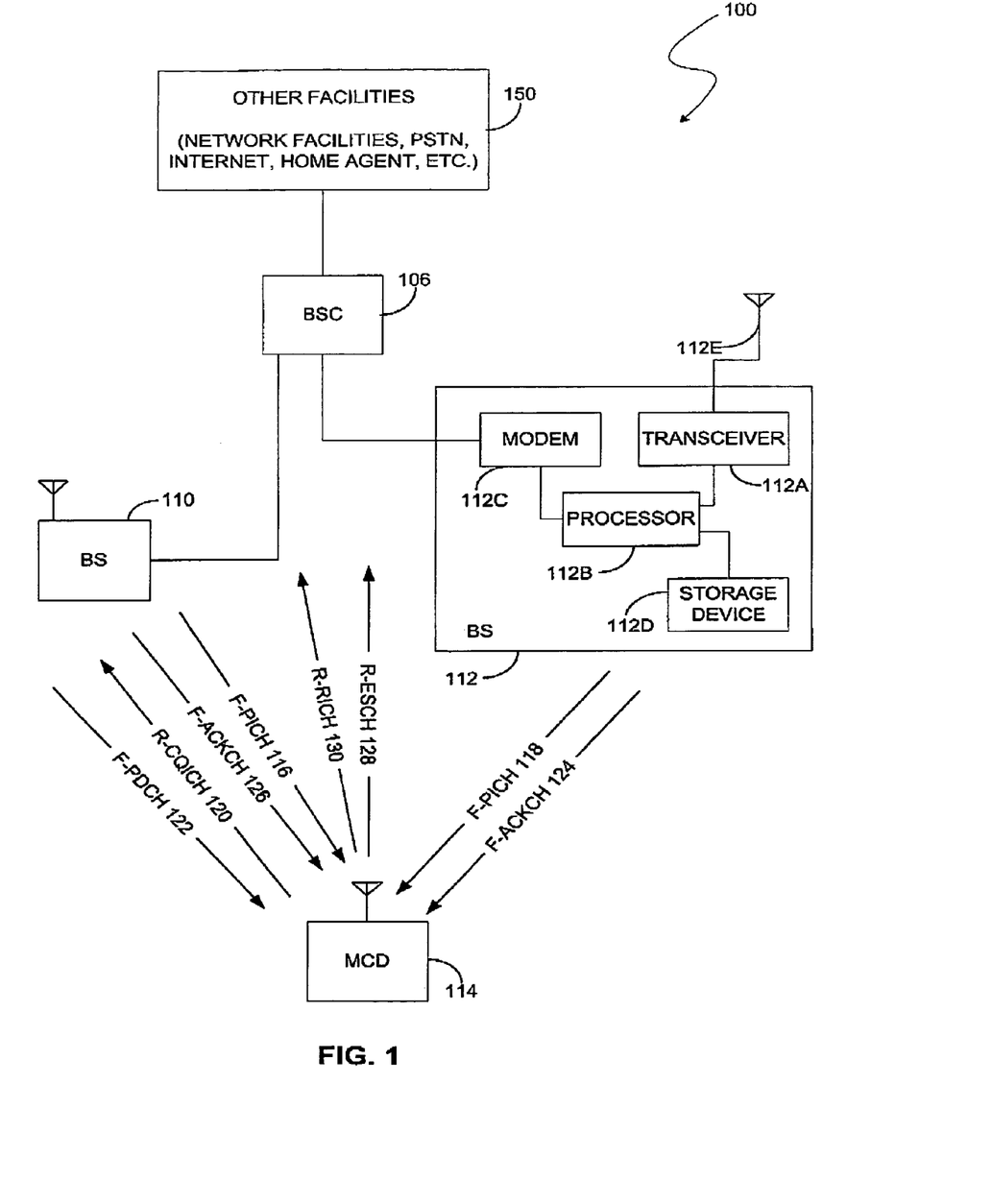
FIG. 1 is a block diagram of a wireless communications network for regulating base station ACK/NAK message transmit power in accordance with one embodiment of the present invention.

FIG. 1 illustrates a simplified block diagram of a wireless communication network 100. In one embodiment, the network 100 may be implemented as a CDMA-2000/IS-2000 (Release C) network, also referred to as 1xEV-DO. This type of network includes, for example, facilities useful for mobile communication devices to receive e-mail, browse the Internet, and exchange other digital data. In addition, the network 100 may be utilized to conduct voice type wireless cellular telephone communications according to TIA standard IS-95 or IS-2000. The IS-95 and IS-2000 standard utilize code division multiple access (CDMA) modulation techniques to conduct wireless voice calls with greater capacity and more robust performance than earlier wireless telecommunications technologies.

The network 100 includes various mobile communication devices (MCDs) 114, each of which may comprise CDMA compatible wireless telephones, IS-856 type high-data rate (HDR) subscriber station, or other suitable devices. The mobile communication devices 114 communicate with various base stations, which in the present example include a serving base station 110 and a non-serving base station 112. The base stations 110, 112 exchange voice and/or packet data content with the mobile communication device 114.

In the wireless voice telephone context, telephone calls and other voice communications are conducted by exchanging data between mobile communication devices 114 and base stations 110, 112 via radio frequency (RF) channels. Base stations also exchange other types of information with the mobile communication devices 114, such as call paging messages, origination messages, registration messages, pilot signal reports, and other digital data.

In the non-voice context, packet data communications are conducted by exchanging packet data of internet protocol (IP) or other appropriate formatting between the mobile communication device 114 and base stations 110, 112 for relay to the Internet or some other packet data network (not shown), such as a corporate network. Examples of packet data include IP datagrams used for such applications as accessing web pages, retrieving e-mail, and the like. Such packet data applications may run directly on the device 114, or may run on a separate computer device that uses the mobile communication device 114 as a wireless modem.

Some or all of the network's base stations (such as base stations 110, 112) may be implemented using hardware such as that used by conventional base stations in commercial use today. Each base station 110, 112 is coupled to a base station controller (BSC) 106, which conducts two-way information flow between the base stations 110, 112 and various other facilities 150 (described below). The BSC 106 performs various functions that allow mobile communication to take place including orchestrating the handoff of the mobile communication device 114 between base stations. In a network of CDMA-2000 architecture, the BSC 106 facilitates data interchange by providing a packet control function (PCF) module to exchange IP data packets with the base stations. The BSC 106 may be implemented using hardware such as that used by conventional wireless networks in commercial use today, as an example.

As mentioned above, the BSC 106 conducts information between the base stations 110, 112 and the other facilities 150. For use in processing voice calls and other IS-95 data, these other facilities 150 may include components such as a mobile switching center (MSC), mobile telephone switching office (MTSO), etc. A MSC component, for example, relays voice stream information between the BSC 106 and the public switched telephone network (PSTN). An MSC also operates to provide mobility control, call processing, and call routing functionality. For use in processing packet data information, the other facilities 150 may include components such as one or more foreign agents, the Internet, one or more home agents, and other components appropriate to the CDMA-2000 or other architecture that is implemented.

As illustrated in FIG. 1, the base station 112 includes various subcomponents, which may also represent the construction of the base station 110 and other base stations (not shown) within the wireless communication network 100. Specifically, the base station 112 includes a transceiver 112a, processor 112b, modem 112c, storage device 112d, and an antenna assembly 112e("antenna").

The antenna assembly 112e includes one or more antennae for exchanging wireless information with the mobile communication device 114. The transceiver 112a, coupled to the antenna assembly 112e, comprises circuitry for modulating electrical signals for broadcast by the antenna assembly 112e, and for demodulating signals received by the antenna assembly 112e.

The modem 112c comprises an interface for conducting communications between the base station 112 and the BSC 106. The modem 112c may comprise a telephone modem, intelligent communications channel, wire/cable/bus, fiber optic link, modulator/demodulator, LAN/WAN or other network card, DSL modem, wireless modem, or other appropriate communications interface.

The processor 112b comprises a digital data processing device that manages operations of the transceiver 112a and modem 112c. The processor 112b may be implemented by various hardware, such as that illustrated in FIG. 2. The processor 112b is coupled to a storage device 112d, or may incorporate such storage device 112d within the processor 112b, depending upon the manner of implementing the processor 112b. The storage device 112d may comprise circuit memory, magnetic disk storage, magnetic tape, optical storage such as CD/DVD, floppy diskette, ROM/PROM/EPROM/EEPROM, etc.

Data processing entities such as components 110, 112, 112b, 112c, 112a, 114, 106 (FIG. 1), and their subcomponents, may be implemented in various forms. One example is a digital data processing apparatus, as exemplified by the hardware components and interconnections of the digital data processing apparatus 200 of FIG. 2.

Figure 2:
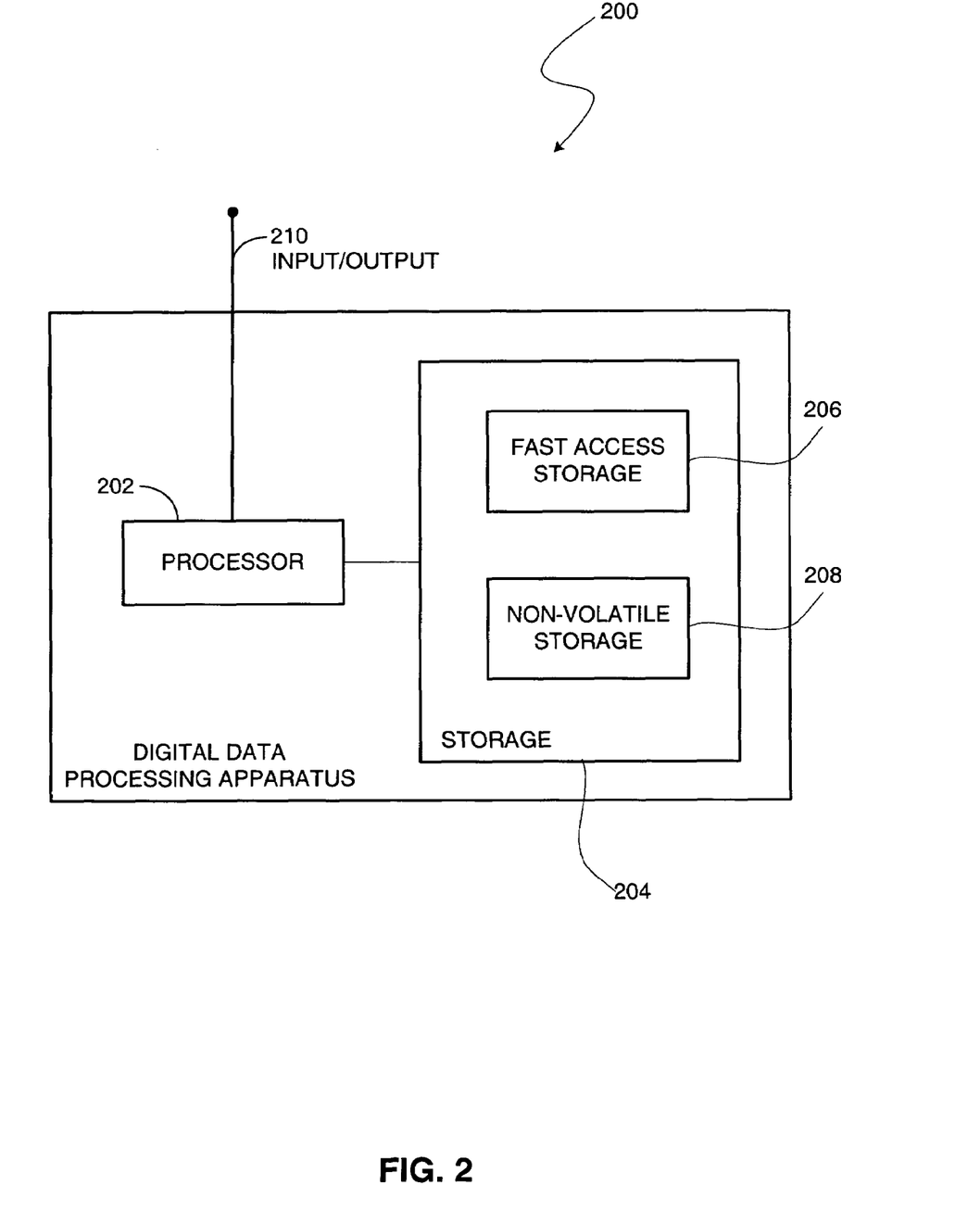
FIG. 2 is a block diagram of an exemplary digital data processing machine according to one embodiment.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive," a tape drive, or any other suitable storage device. The apparatus 200 also includes an input/output 210, such as a line, bus, cable, electromagnetic link, channel, interface, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated. Furthermore, the storage 204, 206, and/or 208 may be provided on-board the processor 202, or even provided externally to the apparatus 200.

In contrast to the digital data processing apparatus discussed above, a different embodiment of the invention uses logic circuitry instead of computer-executed instructions to implement various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Having described various structural features, some operational aspects of the present disclosure are now described. As mentioned above, one operational aspect of the present disclosure involves operations of non-serving base stations to self-adjust power used to transmit messages that acknowledge the mobiles' reverse link packet data transmissions.

Wherever any functionality of the present disclosure is implemented using one or more machine-executed program sequences, such sequences may be embodied in various forms of signal-bearing media. In the context of FIG. 2, such a signal-bearing media may comprise, for example, the storage 204 or another signal-bearing media, such as a magnetic data storage diskette, directly or indirectly accessible by a processor 202. Whether contained in the storage 206, diskette, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic nonvolatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

In contrast to the signal-bearing medium discussed above, some or all of the present disclosure's functionality may be implemented using logic circuitry, instead of using a processor to execute instructions. Such logic circuitry is therefore configured to perform operations to carry out the method aspect of the invention. The logic circuitry may be implemented using many different types of circuitry, as discussed above.

As mentioned above, one operational aspect of the present disclosure involves acts by a base station to set the power level for transmitting messages acknowledging receipt of packet data from a non-served mobile communications device. To aid in the description of this operational aspect, the communications between the mobile communications device 114 and its serving base station 110 and non-serving base stations 112 is now discussed in greater detail, along with a specific discussion of various communications channels employed for such communications. In keeping with the illustrated example, the following explanation is made in the context of CDMA-2000 (Release C).

As mentioned above, packet data is downloaded to the mobile communications device 114 by the serving base station 110 alone. This occurs over a forward packet data channel (F-PDCH) 122. The device 114 uploads packet data to any base station in its active set, whether it is a serving base station 110 or a non-serving base station 112. This transmission occurs over a reverse enhanced supplemental channel (R-ESCH) 128. When the device 114 uploads packet data to a base station 110, 112, the respective base station 110, 112 acknowledges by transmitting an appropriate message on the respective forward acknowledge channel (F-ACKCH) 126, 124. In the present example, acknowledge messages comprise positive (ACK) and negative acknowledgement (NAK) messages. In the case of BPSK modulation, for example, the ACK may comprise a +1 value and the NAK comprises a −1 value. In the case of ON-OFF keying modulation, for example, the ACK comprises a +1 value and the NAK comprises a 0 value. These values may be reversed or other systems used to distinguish the ACK and NAK messages, as will be apparent to those of ordinary skill in the art having the benefit of this disclosure.

The base stations 110, 112 transmit respective pilot signals on forward pilot channels (F-PICH) 116, 118. Responsive to receiving the pilot signal 116 from its serving base station 110, the device 114 evaluates the pilot signal 116 and provides an evaluation of the forward link channel quality on a reverse channel quality indicator channel (R-CQICH) 120. Since the non-serving base station 112 does not transmit forward link packet data to the device 114, no R-CQICH channel 120 is provided for use between the device 114 and the non-serving base station 112.

As mentioned above, R-CQICH 120 only exists between the serving base station 110 and mobile communications device 114. In addition to the forward link packet data messages on the F-PDCH 122, the transmit power level of the forward link acknowledge messages on the F-ACKCH 126 is set according to the channel metric information on R-CQICH 120. Analogous information is not available to the non-serving base station 112, presenting a challenge for the base station 112 to properly set the transmit power for messages on F-ACKCH 124.

Figure 3:
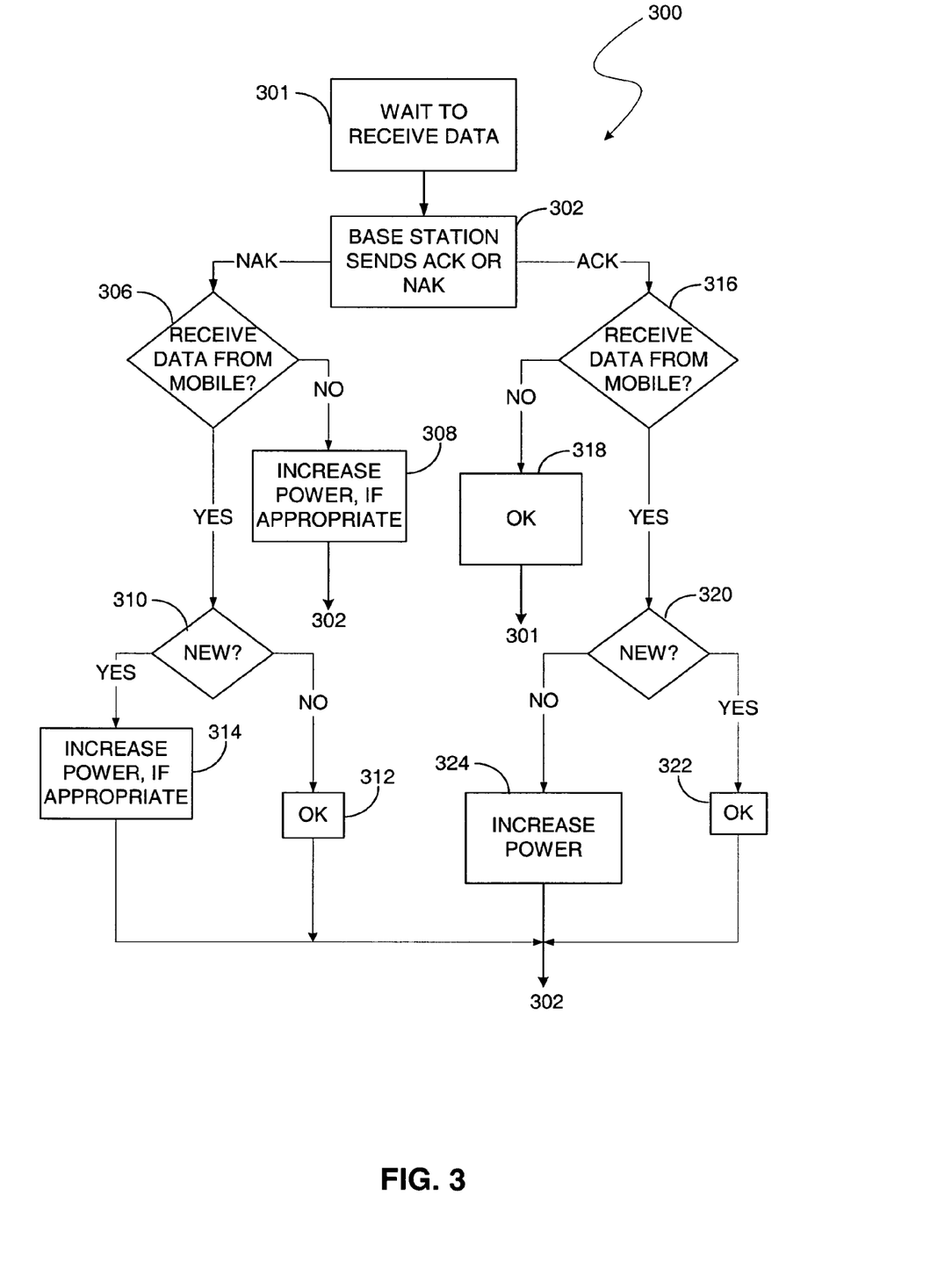
FIG. 3 is a flowchart illustrating a first exemplary sequence to regulate transmission power for a non-serving base station forward link ACK messages according to one embodiment of the present invention.

FIG. 3 depicts one exemplary sequence 300 for the non-serving base station 112 to set the transmit power level for messages (on F-ACKCH 124) acknowledging packet data received (on R-ESCH 128) from the mobile communication device 114. More particularly, FIG. 3 is a flowchart illustrating a first exemplary sequence to utilize the progression (or not) of handshaking events to regulate transmission power for non-serving base station forward link ACK/NAK messages. Without any intended limitation, the sequence 300 is described in the context of the network 100 from FIG. 1, employing the protocol and architecture of CDMA-2000 (Release C).

In block 301, the non-serving base station 112 waits to receive reverse link packet data from the mobile communication device 114 via R-ESCH 128. When this data is received correctly, the non-serving base station 112 transmits an ACK message in block 302 via the F-ACKCH 124 to the mobile communication device 114. If, however, this data is received incorrectly, the non-serving base station 112 sends a NAK message in block 302 via the F-ACKCH 124 to the non-serving mobile communication device 114.

If an ACK message was sent in block 302, the non-serving base station 112 then waits for the next packet and determines whether the mobile communication device 114 subsequently returned any packet data via R-ESCH 128 (block 316). If the mobile communication device 114 does not return any packet data, it is inferred by the non-serving base station 112 that the ACK message of block 302 was properly received at the mobile communication device 114, and that the mobile communication device 114 does not have any additional packet data ready to transmit. In this particular case, the non-serving base station 112 need not adjust the transmit power for its future ACK/NAK messages (block 318) as a result of the mobile communication device 114 having properly received the ACK message in block 302. In an alternative embodiment, the non-serving base station 112 may decrease the ACK/NAK message transmit power by a predetermined amount, which may be smaller or less frequently applied than the amount for increasing ACK/NAK transmit power (which is described in detail below). The predetermined amount by which the non-serving base station 112 may decrease the ACK/NAK message transmit power may include a fixed decrement (in Watts, dB, etc.), percentage of transmit power, or any other amount determined by an appropriate algorithm. After block 318, the non-serving base station 112 waits to receive further reverse link data in block 301 through the R-ESCH 128 from the mobile communication device 114.

If the non-serving base station 112 receives packet data from the mobile communication device 114 in block 316, the non-serving base station 112 determines whether this data is new or a repeat of the last data transmitted by the mobile communication device 114 in block 320. If the transmitted data is new, it is inferred by the non-serving base station 112 that the ACK message of block 302 was properly received at the mobile communication device 114, and the non-serving base station 112 need not adjust the transmit power for its next ACK/NAK message at block 322. In an alternative embodiment, as with block 318, the non-serving base station 112 may decrease the transmit power of future ACK/NAK messages slightly by a predetermined amount, if so desired.

After block 322, the non-serving base station 112 sends an ACK message (if the packet was received correctly) or a NAK message (if the packet was received incorrectly and requires retransmission) to the mobile communication device 114. In either case, the power level of this ACK or NAK message incorporates the transmit power adjustment of block 322 (providing there was a power adjustment made).

If it is determined in block 320 that the data corresponds to a retransmission (i.e., the data transmitted is not new) by the mobile communication device 114, then it is inferred by the non-serving base station 112 that the mobile communication device 114 did not properly receive the base station 112's ACK message of block 302. In this case, the non-serving base station 112 increases the transmit power for future ACK/NAK messages by a predetermined amount, which may include a fixed increment (in Watts, dB, etc.), percentage of transmit power, or any other amount determined by an appropriate algorithm. In one embodiment, the amount of increase in the transmit power performed in block 324 may be substantially larger than the amount of decrease in the transmit power that may have been performed in block 318 and block 322. This results in the ACK/NAK transmit power to gradually decrease until it fails to arrive at the mobile communication device 114, and then it jumps up by a large margin. This approach enables a selectable fail/success ratio for ACK/NAK transmissions, depending on the ratio between the increment or decrement amounts.

After increasing the transmit power in block 324, the non-serving base station 112 sends an ACK message (if the packet was received correctly) or a NAK message (if the packet was received incorrectly and requires retransmission) at block 302. In either case, the power level of this ACK or NAK message incorporates the increased transmit power adjustment performed at block 324.

When the non-serving base station 112 sends a NAK message in block 302 after failing to receive data correctly from the mobile communication device 114 in block 301, the routine proceeds to block 306, where the non-serving base station 112 determines whether the mobile communication device 114 returned any packet data via the R-ESCH 128 after the NAK message of block 302. The inquiry of block 306 may be limited to a prescribed time period, such as several seconds or minutes or an event-driven time period such as the interval before some non-packet-data communication is received from the mobile communication device 114, or the inquiry of block 306 may be conducted at a predetermined time if the timing is known in advance from the time that a base station sends the NAK message until the time the mobile communication device 114 responds to retransmit the packet If the mobile communication device 114 does not return any packet data in the appropriate time period or time, one possibility is that the NAK message of block 302 was not properly received at the mobile communication device 114, otherwise it would have resent the packet data. Another possibility is that the serving base station 110 (or other non-serving base station, if any) correctly received the packet data, and duly acknowledged receipt to the mobile communication device 114 with its own ACK message. In the first case, the non-serving base station 112 should increase the transmit power of future ACK/NAK messages in block 308. In the second case, there may be no need to increase future ACK/NAK transmit power in block 308 depending whether the NAK message of block 302 was properly received at the mobile communication device 114.

In accordance with one embodiment, the non-serving base station 112 may not increase the transmit power of future ACK/NAK messages in block 308 as a result of the non-serving base station 112 assuming that the NAK message of block 302 was properly received at the mobile communication device 114 and another base station within the network 100 received the data and acknowledged the transmitted data with an ACK message that was not acknowledged by the non-serving base station 112 with a NAK message in block 302. In another embodiment, the non-serving base station 112 may probabilistically increase the transmit power for future ACK/NAK messages in block 308. In one embodiment, the non-serving base station 112 decides to increase its transmit power for future ACK/NAK messages with certain probability and keep its transmit power for future ACK/NAK messages unchanged otherwise. Under this approach, if the probability is 50%, for example, the non-serving base station 112 only increases the transmit power for the ACK/NAK messages in block 308 with a probability of 50% and does not increase the transmit power otherwise. In another example, the probability may be determined by estimating the likelihood that the packet data was negatively-acknowledged by the non-serving base station 112 through a NAK message that is received correctly, but acknowledged by some other base station through an ACK message. This probability may be estimated, for example, by the non-serving base station 112 exchanging log data with other base stations of the network 100, and then considering the historical occurrence of messages being negatively-acknowledged (i.e., NAK-ed) by the non-serving base station 112 but acknowledged (i.e., ACK-ed) by some other base station in the network 100. In one embodiment, all of the base stations within the network 100 communicate to exchange the log data amongst themselves. In another embodiment, the base stations of the network 100 may communicate with the base station controller 106 or other hierarchically superior or commonly accessible units within the network 100, which are responsible for computing probabilities and distributing this information to some or all of the base stations within the network 100. Under this approach, if the non-serving base station 112 determines that 35% of reverse link packet data messages that were NAK-ed by the non-serving base station 112 were actually ACK-ed by at least one other base station of the network 100, then the non-serving base station 112 (in block 308) increases its transmit power with a probability of 65% and would not increase its transmit power with a probability of 35% in block 308. The non-serving base station 112 may increase the transmit power for its ACK/NAK messages in block 308 in the same manner as described for block 324 above. After block 308, the sequence returns to block 302 where the non-serving base station 112 sends another NAK message to the mobile communication device 114.

Alternatively, if the non-serving base station 112 does receive data from the mobile communication device 114 in block 306, the non-serving base station 112 determines whether the received data is new or a retransmission of the last data transmitted by the mobile communication device 114 (block 310). There may be several ways in which the non-serving base station 112 may determine whether a received data packet is a new packet or a re-transmission. One technique may be to look at the control information associated with the packet transmitted on the R-ESCH 128, which may be conveyed via the R-RICH (Reverse Rate Indicator Channel) 130 (or via other channels). Other techniques to determine whether a received data packet is a new packet or a re-transmission will be readily apparent to those of ordinary skill in the art having the benefit of this disclosure.

If it is determined in block 306 that the received data from the mobile communication device 114 is new, the NAK message of block 302 might not have been properly received at the mobile communication device 114, otherwise the mobile communication device 114 would have resent the same data that had been NAK-ed. Or, alternatively, the reverse link packet data that was NAK-ed by the non-serving base station 112 was positively acknowledged by the serving base station 110 or some other non-serving base station of the network 100. Thus, the non-serving base station 112 may choose not to adjust its transmission power level for future ACK/NAK message transmissions, or may choose to increase the transmit power based on a certain probability depending on past instances that packets were NAK-ed by the non-serving base station 112 but ACK-ed by some other base station in the network 100 (block 314). In this case, block 314 may employ the same analysis for whether to increase the transmit power as is performed in block 308, and the same manner of increasing the transmit power if a decision is made to increase power. After block 314, the non-serving base station 112 returns to block 302 to transmit an ACK message to the mobile communication device 114 if the new packet is received correctly and a NAK if the new packet is received incorrectly by the non-serving base station 112 and needs to be retransmitted.

If, however, the reverse link packet data is a repeat of the mobile communication device 114's previous transmission, then it is inferred that the mobile communication device 114 properly received the non-serving base station 112's NAK message of block 302 (in block 312). In this case, the non-serving base station 112 need not change the ACK/NAK transmit power, or may decrease the transmit power slightly as previously discussed with regard to blocks 318 and 322. After block 312, the non-serving base station 112 returns to block 302 to transmit an ACK message to the mobile communication device 114 if the new packet is received correctly and a NAK message if the new packet is received incorrectly by the non-serving base station 112 and needs to be retransmitted.

Figure 4:
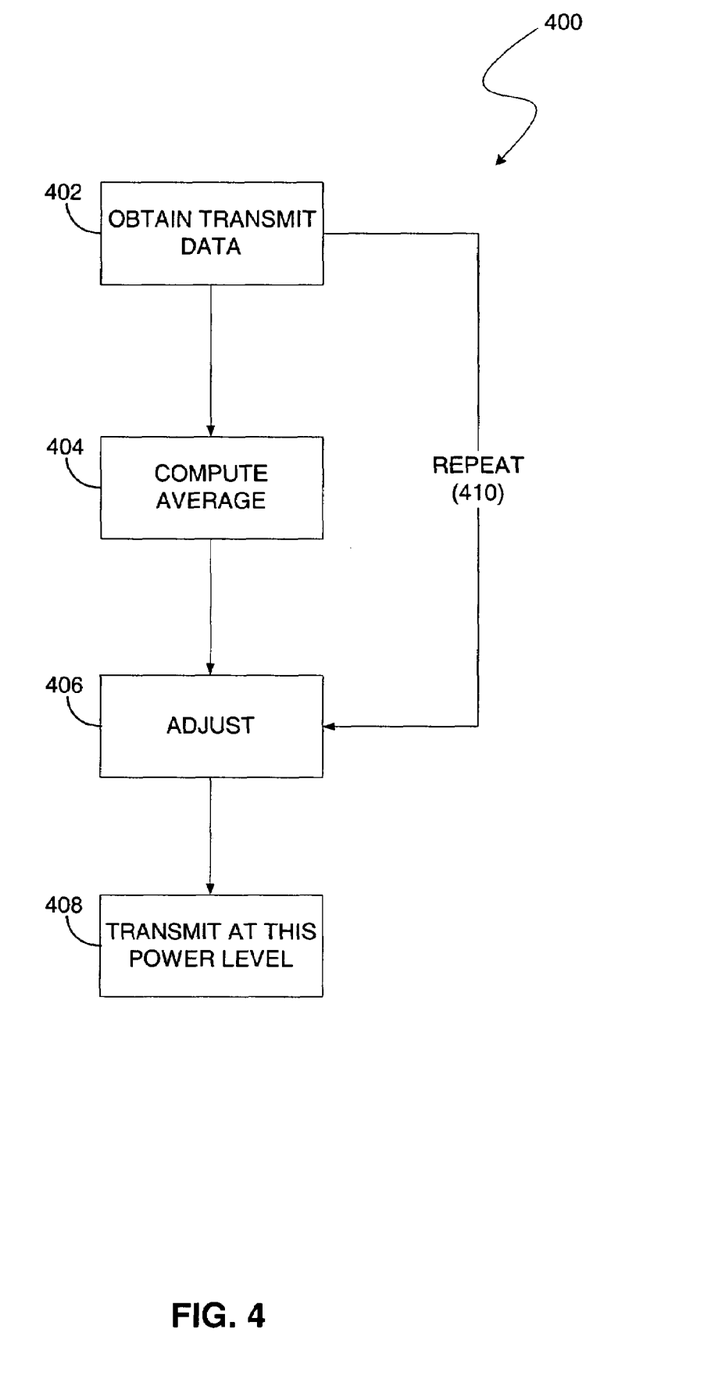
FIG. 4 is a flowchart illustrating a second exemplary sequence to regulate transmission power for non-serving base station forward link ACK messages according to another embodiment of the present invention.

FIG. 4 depicts a sequence 400 for the non-serving base station 112 to set the power level for transmitting messages acknowledging receipt of packet data from the mobile communications device 114. More particularly, FIG. 4 is a flowchart illustrating an exemplary sequence to regulate transmission power for base station forward link ACK/NAK messages, using an actual or estimated transmit power of the serving base station 110 as a reference. Without any intended limitation, the sequence 400 is described in the context of the network 100 from FIG. 1, employing the protocol and architecture of CDMA-2000 (Release C).

In block 402, the non-serving base station 112 obtains one or more records of a parameter, index, subcomponent, or other number that varies in relation to the serving base station 110's signal strength of transmissions to the mobile 114. For discussion purposes, this may be referred to as the "transmission parameter." The record obtained in block 402 provides the serving base station 110's transmission parameter over a given period of time.

In one embodiment, the transmission parameter may include the serving base station 110's actual transmit signal strength used to send certain types of past messages, for example. For example, this transmission parameter may be obtained from the serving base station 110's own records of its historical levels for transmitting ACK/NAK signals or forward link packet data to the mobile communication device 114, or the transmit signal strength of the serving base station 110 may be derived using this and/or other information. In another example, the transmission parameter includes signal strength measurements that embody some past channel metrics returned by the mobile communication device 114 over the channel R-CQICH 120. For example, this may include the channel quality indicator (CQI) feedback from the mobile communication device 114 to the serving base station 110 via the R-CQICH 120. In any case, block 402 may be achieved, for example, by the non-serving base station 112 directing an appropriate request to the BSC 106, or to the serving base station 110 via the BSC 106.

In block 404, the non-serving base station 112 utilizes the "transmission parameter" to compute an average of the base station's transmit power (actual or estimated) to the mobile communication device 114 over the given time period. This given time period may comprise, for example, the last ten seconds, one minute, or another useful time frame. Some guidelines for selecting this time period, for example, may include the fading characteristic, the speed of the mobile communication device 114, etc. that may be estimated from the CQI feedback from the mobile communication device 114.

In one embodiment of block 404, where the serving base station 110's historical transmit signal strength was obtained from the base station 110 in block 402 (and this constitutes the "transmission parameter"), block 404 utilizes this figure to compute an average of the serving base station 100's actual forward link transmit signal strength to the mobile communication device 114. In another embodiment, where the CQI feedback is obtained from the serving base station 110 in block 402 (and this constitutes the "transmission parameter"), block 404 is performed by estimating the serving base station's transmit power and averaging this figure over a given time period. The serving base station 110's transmit power is estimated by reducing a "received power requirement" by the CQI feedback from the mobile communication device 114 to the serving base station 110 reported via the R-CQICH channel 120. The received power requirement is usually a fixed number representing a minimum signal quality requirement to obtain a certain reliable receipt of the ACK/NAK messages at the mobile communication device 114. In CDMA-2000 and other systems, the received power requirement and other system parameters are determined when the wireless system is initially deployed. Moreover, the received power requirement may be updated or adjusted and propagated across the network to advise individual base stations of such an update.

After computing the serving base station 110's average transmit power in block 404, the non-serving base station 112 adjusts the computed average by a prescribed amount in block 406. This may be achieved by adding or subtracting a fixed or changeable number, multiplying by one or more factors, etc. The result is a "target" transmit power level. In a more specific example, the average transmit power level from block 404 is adjusted by adding a prescribed margin (or "delta"), which comprises a network-specified maximum difference between the average forward link channel quality of the strongest and that of the weakest base stations in a mobile communication device's active set. In this example, both the average transmit power and the prescribed margin are in decibels. The margin is added to the computed average of the transmission power at the serving base station (from block 404) because it is presumed that the non-serving base station 112's signal is weaker at the mobile communication device 114 (since the base station 112 has the role of a non-serving base station), and therefore needs more power in order to achieve the desired power at the mobile communication device 114.

As discussed above, blocks 402-406 are performed by the non-serving base station 112. As an alternative, these blocks may be performed by the serving base station 110, the BSC 106, or another entity external to the non-serving base station 112, with the computed target transmit level being ultimately relayed to the non-serving base station 112 for its further use (block 408) as discussed below.

After block 406, whenever the non-serving base station 112 transmits any ACK, NAK, or other messages acknowledging receipt of packet data from the mobile communication device 114, the non-serving base station 112 utilizes the target transmit power level at block 408. The non-serving base station 112 may repeat blocks 402-406 (as shown by repeat loop 410) according to a periodic, non-periodic, or other schedule sufficient to ensure that the target transmit power level is computed according to fresh data. As a further example, the non-serving base station 112 may repeatedly compute the target transmit power based upon a moving window of prescribed delay and time width. As still another example, the non-serving base station 112 may repeat the analysis of blocks 402-406 for each ACK/NAK message to be transmitted, every other ACK/NAK message, every third one, etc. without departing from the spirit and scope of the present invention.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A method for adjusting a transmit power level of a base station, the base station transmitting messages that acknowledge receipt of packet data from a mobile communication device (MCD), comprising:
   transmitting an acknowledgement message to the MCD in response to receiving first packet data therefrom;
   determining whether the acknowledgement message was correctly received by the MCD based on whether a next communication received by the base station from the MCD includes second packet data that was a re-transmission of the first packet data transmitted by the MCD or new packet data; and
   adjusting the transmit power level of the base station for future acknowledgement messages transmitted to the MCD based on determining whether the transmitted acknowledgement message was correctly received by the MCD.

2. The method of claim 1, wherein said adjusting the transmit power level comprises:
   increasing the transmit power level of the base station by a first amount for future acknowledgement messages transmitted to the MCD responsive to determining that the second packet data was the re-transmission of the first packet data transmitted by the MCD.

3. The method of claim 1, wherein said adjusting the transmit power level comprises:
   decreasing the transmit power level of the base station by a second amount for future acknowledgement messages transmitted to the MCD responsive to determining that the new packet data was transmitted by the MCD.

4. The method of claim 1, wherein said adjusting the transmit power level comprises:
   preventing the adjustment of the transmit power level of the base station for future acknowledgement messages transmitted to the MCD responsive to determining that the new packet data was transmitted by the MCD.

5. The method of claim 1, comprising:
   transmitting a negative acknowledgement (NAK) message to the MCD in response to the base station not receiving the first packet data transmitted from the MCD;
   determining whether third packet data has been received by the base station from the MCD subsequent to transmitting the NAK message to the MCD; and
   increasing the transmit power level of the base station by a first amount for future acknowledgement messages transmitted to the MCD responsive to determining that no third packet data has been received by the base station from the MCD.

6. The method of claim 5, wherein said determining whether third packet data has been received by the base station comprises:
   determining whether new packet data has been received by the base station from the MCD subsequent to transmitting the NAK message to the MCD; and
   increasing the transmit power level of the base station by the first amount for future acknowledgement messages transmitted to the MCD responsive to determining that new packet data has been received by the base station from the MCD.

7. The method of claim 6, comprising:
   preventing the adjustment of the transmit power level of the base station for future acknowledgement messages transmitted to the MCD responsive to determining that no new packet data has been received by the base station from the MCD.

8. An apparatus for adjusting a transmit power level of a base station, the base station transmitting messages that acknowledge receipt of packet data from a mobile communication device (MCD), comprising:
   means for transmitting an acknowledgement message to the MCD in response to receiving first packet data therefrom;
   means for determining whether the acknowledgement message was correctly received by the MCD based on whether a next communication received by the base station from the MCD includes second packet data that was a re-transmission of the first packet data transmitted by the MCD or new packet data; and
   means for adjusting the transmit power level of the base station for future acknowledgement messages transmitted to the MCD based on determining whether the transmitted acknowledgement message was correctly received by the MCD.

9. The apparatus of claim 8, wherein said means for adjusting the transmit power level comprises:
   means for increasing the transmit power level of the base station by a first amount for future acknowledgement messages transmitted to the MCD responsive to determining that the second packet data was the re-transmission of the first packet data transmitted by the MCD.

10. The apparatus of claim 8, wherein said means for adjusting the transmit power level comprises:
    means for decreasing the transmit power level of the base station by a second amount for future acknowledgement messages transmitted to the MCD responsive to determining that the new packet data was transmitted by the MCD.

11. The apparatus of claim 8, wherein said means for adjusting the transmit power level comprises:
    means for preventing the adjustment of the transmit power level of the base station for future acknowledgement messages transmitted to the MCD responsive to determining that the new packet data was transmitted by the MCD.

12. The apparatus of claim 8, comprising:
    means for transmitting a negative acknowledgement (NAK) message to the MCD in response to the base station not receiving the first packet data transmitted from the MCD;

means for determining whether third packet data has been received by the base station from the MCD subsequent to transmitting the NAK message to the MCD; and means for increasing the transmit power level of the base station by the first amount for future acknowledgement messages transmitted to the MCD responsive to determining that no third packet data has been received by the base station from the MCD.

13. The apparatus of claim 12, wherein said means for determining whether third packet data has been received by the base station comprises:

means for determining whether new packet data has been received by the base station from the MCD subsequent to transmitting the NAK message to the MCD; and means for increasing the transmit power level of the base station by the first amount for future acknowledgement messages transmitted to the MCD responsive to determining that new packet data has been received by the base station from the MCD.

14. The apparatus of claim 13, comprising:

means for preventing the adjustment of the transmit power level of the base station for future acknowledgement messages transmitted to the MCD responsive to determining that no new packet data has been received by the base station from the MCD.

15. A base station for transmitting messages that acknowledge receipt of packet data from a mobile communication device (MCD), comprising:

a transmitter for transmitting an acknowledgement message to the MCD in response to receiving first packet data therefrom; and a controller for determining whether the acknowledgement message was correctly received by the MCD based on whether a next communication received by the base station from the MCD includes second packet data that was a re-transmission of the first packet data transmitted by the MCD or new packet data, and adjusting the transmit power level of the base station for future acknowledgement messages transmitted to the MCD based on determining whether the transmitted acknowledgement message was correctly received by the MCD.

16. The base station of claim 15, wherein said controller increases the transmit power level of the base station by a first amount for future acknowledgement messages transmitted to the MCD responsive to determining that the second packet data was the re-transmission of the first packet data transmitted by the MCD.

17. The base station of claim 15, wherein said controller decreases the transmit power level of the base station by an amount for future acknowledgement messages transmitted to the MCD responsive to determining that the new packet data was transmitted by the MCD.

18. A wireless communication system, comprising:

at least one mobile communication device (MCD);

at least one base station for transmitting messages that acknowledge receipt of packet data from the MCD; and the at least one base station comprising:

a transmitter for transmitting an acknowledgement message to the MCD in response to receiving first packet data therefrom;

a controller for determining whether the acknowledgement message was correctly received by the MCD based on whether a next communication received by the base station from the MCD includes second packet data that was a re-transmission of the first packet data transmitted by the MCD or new packet data, and adjusting the transmit power level of the base station for future acknowledgement messages transmitted to the MCD based on determining whether the transmitted acknowledgement message was correctly received by the MCD.

19. The wireless communication system of claim 18, wherein said controller increases the transmit power level of the base station by a first amount for future acknowledgement messages transmitted to the MCD responsive to determining that the second packet data was the re-transmission of the first packet data transmitted by the MCD.

20. The wireless communication system of claim 18, wherein said controller decreases the transmit power level of the base station by a second amount for future acknowledgement messages transmitted to the MCD responsive to determining that the new packet data was transmitted by the MCD.

* * * * *

UNITED STATES PATENT AND TRADEMARK OFFICE
CERTIFICATE OF CORRECTION

| | | |
|---|---|---|
| PATENT NO. | : 7,292,873 B2 | |
| APPLICATION NO. | : 10/637226 | |
| DATED | : November 6, 2007 | |
| INVENTOR(S) | : Yongbin Wei and Tao Chen | |

It is certified that error appears in the above-identified patent and that said Letters Patent is hereby corrected as shown below:

On the Title page, Assignee, (73), "Qualcomm Incorporated", should read --QUALCOMM Incorporated--.

On the Title page, Abstract, (57), lines 1, 4, and 9, for the abbreviation "LBS", each occurrence should read --BS--.

On the Title page, Abstract, (57), lines 4, 5, 7, 11, 13, and 17, for the abbreviation "MAD", each occurrence should read --MCD--.

Signed and Sealed this

Sixteenth Day of December, 2008

JON W. DUDAS
*Director of the United States Patent and Trademark Office*